No. 643,553. Patented Feb. 13, 1900.
O. SROKA.
ATTACHMENT FOR SCREW CUTTING MACHINES.
(Application filed Jan. 24, 1899.)
(No Model.) 3 Sheets—Sheet 1.
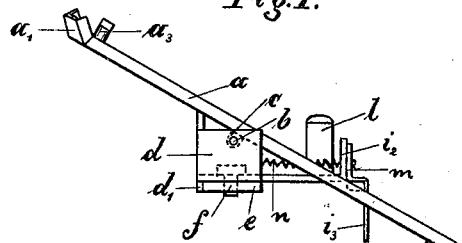
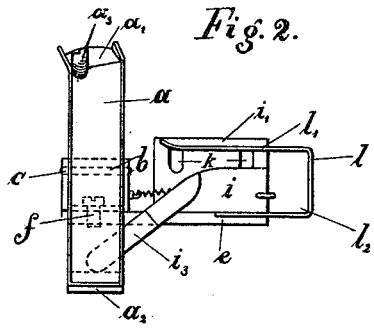
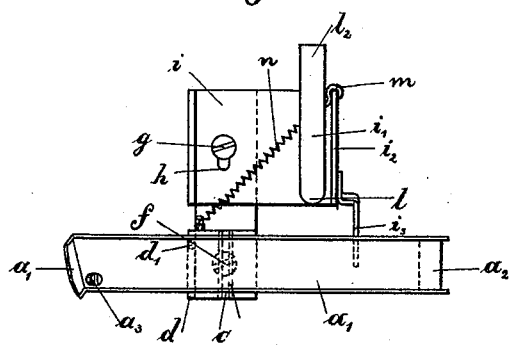
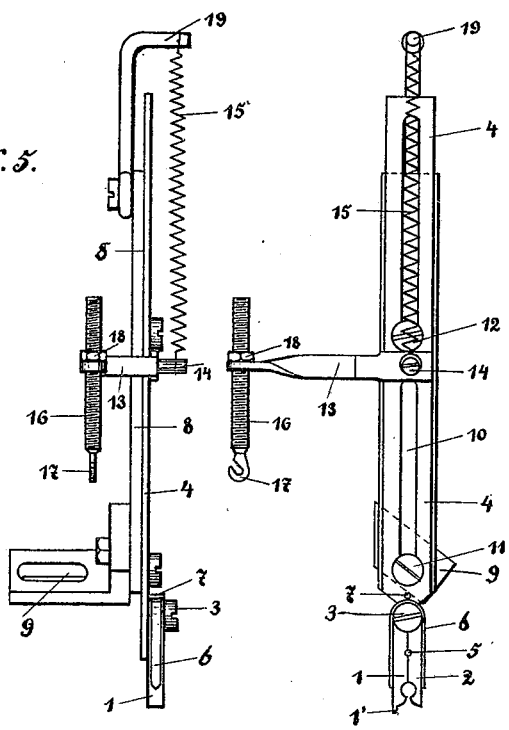
Witnesses:
Inventor:
Otto Sroka, No. 643,553. Patented Feb. 13, 1900.
O. SROKA.
ATTACHMENT FOR SCREW CUTTING MACHINES.
(Application filed Jan. 24, 1899.)
(No Model.) 3 Sheets—Sheet 2.
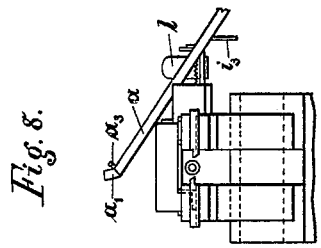
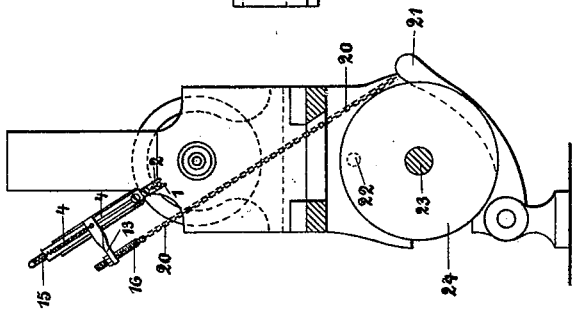
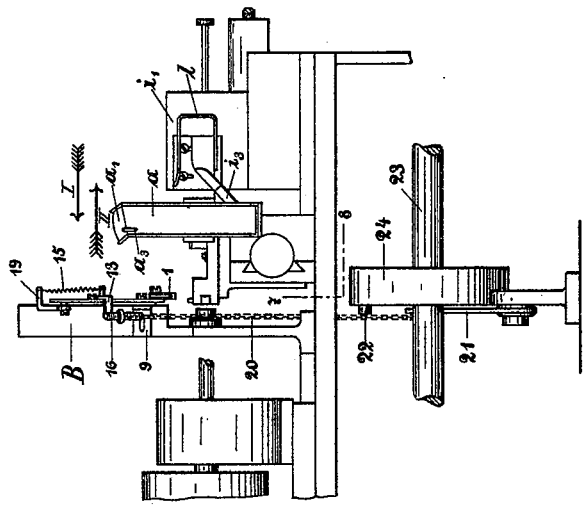
Witnesses=
Inventor=
Otto Sroka,
by
atty No. 643,553. Patented Feb. 13, 1900.
O. SROKA.
ATTACHMENT FOR SCREW CUTTING MACHINES.
(Application filed Jan. 24, 1899.)
(No Model.) 3 Sheets—Sheet 3.
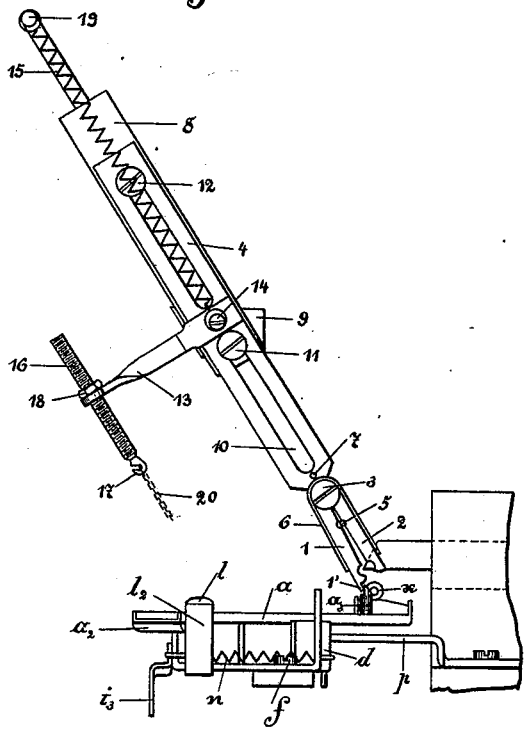
Fig. 9.
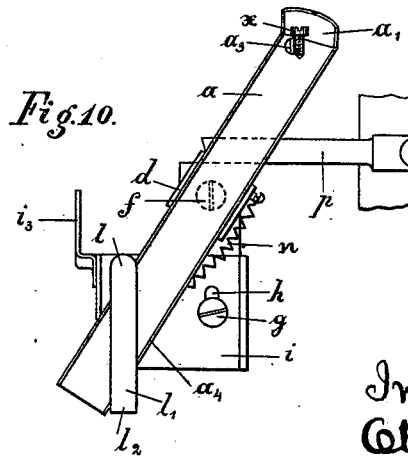
Fig. 10.
Witnesses:
Inventor:
Otto Sroka,
atty

UNITED STATES PATENT OFFICE.

OTTO SROKA, OF BERLIN, GERMANY, ASSIGNOR TO ALBRECHT SCHWARTZKOPFF, OF SAME PLACE.

ATTACHMENT FOR SCREW-CUTTING MACHINES.

SPECIFICATION forming part of Letters Patent No. 643,553, dated February 13, 1900.

Application filed January 24, 1899. Serial No. 703,267. (No model.)

*To all whom it may concern:*

Be it known that I, OTTO SROKA, a subject of the German Emperor, residing at 7 Reinickendorfestrasse, Berlin, Germany, have invented certain new and useful Improvements in Attachments for Automatic Screw-Cutting Machines for the Automatic Delivery of the Finished Screws; and I do hereby declare the following to be a full, clear, and exact description of the invention, such as will enable others skilled in the art to which it appertains to make and use the same.

This invention relates to an improvement in automatic screw-cutting machines, whereby the screws after having been cut and when ready to leave the machine are made to collect of their own accord at their proper place of delivery instead of being allowed to fall upon the same plate that is provided for intercepting the metal cuttings or chips.

The invention mainly resides in the coöperation of an intercepting device and a holding device, the latter being adapted to grasp each screw as it is cut and while yet it adheres to the rotating wire or blank, but before it is threaded, and to hold it during and after the threading process until the screw intercepting or collecting device has been brought under the work, and this does not happen until such time as the work discontinues shedding any more chips, or, in other words, not until after the threading of the screw has been completed, at which juncture the holding device delivers up the screw to the collector, the result attained by this arrangement being that the finished screw in leaving the machine is entirely free from chips.

The invention is illustrated in the accompanying drawings, in which—

Figures 1 to 3 are three different views of the screw-receiving device or collector, which is shown in the position it takes up for the purpose of carrying the screws out of the machine. Figs. 4 and 5 are respectively a side elevation and a top view or plan of the screw holding or retaining device at rest. Fig. 6 illustrates the manner in which the said retaining device and collector are arranged in a screw-cutting lathe, the collector being shown in the position in which it is about to carry away a screw. Fig. 7 is a side elevation corresponding to Fig. 6 and supposed to be viewed in the direction of the arrow I, the parts situated on the right-hand side of Fig. 6 being cut away along the line 7 8. Fig. 8 is another side elevation corresponding to Fig. 6, viewed in the direction of the arrow II, with the parts situated on the left-hand side of that figure cut away along the line 7 8. Fig. 9 shows the position of the collector in relation to the retaining device at the moment of delivery of the screw to the former appliance; and Fig. 10 is a plan of the collector or intercepter corresponding to Fig. 9.

As shown in Figs. 1 to 3, the screw intercepter or collector consists of a groove, chute, or channel $a$ of U-shaped section, the stationary supporting socket or bearing $b$ of which is so mounted upon the pivot $c$ as to swing or oscillate in the bent frame $d$, which is likewise U-shaped. The upper end of the channel $a$ at $a'$ is bent upward, while the lower end carries a weight $a^2$—say of lead—which normally maintains the channel in an inclined position. The said channel is furthermore provided with a pin or stud $a^3$, the object of which will be stated farther on. The frame $d$ is pivoted to the bridge $e$ by means of the screw-bolt $f$, whereon it is revoluble. The said bridge $e$ is by means of the screw $g$ adjustably secured in the slot $h$ of the frame $i$. This frame $i$ is attached to a stationary part of the screw-lathe—say, to the rest or fast headstock $i'$, Fig. 6—which carries the cutting-tool through the medium of the elongated apertures $k$, provided in its rear wall $l'$, while the front wall $i^2$ of the said frame $i$ is constructed in the shape of a downwardly-bent guide $i^3$, which limits the incline of the channel $a$, such channel resting upon the said guide $i^3$ while the screws are being conducted from the machine and being positively guided thereon by the action of the weight $a^2$. To the frame is attached another bent or U-shaped frame $l$, which serves to limit the horizontal position of the channel $a$, which in turning rises by a sliding upward movement along the guide $i^3$ and takes up its position between the upper edge $i^2$ of the guide $i'$ and the bent frame $l$. With the front wall of the frame $i$ at $m$ there engages a helical spring $n$, the opposite end of which is secured to the frame $d$.

The operation of the mechanism is as follows: To the support or rest which carries the threading-tool there is secured a stop $p$, Figs. 9 and 10, which as the said threading-tool rest advances impinges upon the frame $d$ and compels the same, along with the channel $a$, to perform a rotary movement on the pivot $f$, and inasmuch as the channel $a$ by reason of its preponderating weight $a^2$ rests upon the inclined guide $i^3$ with positive pressure its upper end $a'$ as it turns on the pivot $f$ is lowered and is brought to a horizontal position, which is bounded at the top by the portion $l'$ of the frame $l$ and laterally by the contact between the wall $a^4$ and the bridge $l^2$ of the said frame $l$, whereby the spring $n$ is extended. In this situation the channel or chute $a$ is ready to receive a threaded screw. The moment the screw $x$ is given up to this chute or channel $a$ the stop $p$ recedes, so that the said chute $a$ under the action of the spring $n$ may resume its inclined position, the pin $d'$, projecting from the bent frame $d$ at this juncture, striking the bridge $e$, so as to limit the rotary movement of the frame $d^2$, while the "overweight" $a^2$ insures the downward movement of the channel $a$ along the inclined guide $i^3$, the screw during this movement sliding down into the collector ready for its reception.

The retaining device adapted to hold the threaded screw until the intercepting channel is brought under such screw consists of the following parts, as shown in Figs. 4 and 5. The holding-nippers proper, consisting of the two jaws or cheeks 1 and 2, are so secured to the slide 4 by means of the screw 3 that the said jaws may open and close around the smooth neck of the screw. Both jaws of the nippers have semicircular slots at about the middle of their length, whereby as they close they are made to impinge against a pin 5, which projects from the slide 4 and serves to limit their closing movement. Over the jaws there is passed a flat spring 6, which tends to keep the nipper-jaws closed. A pin 7 prevents the said flat spring from being stripped off the jaws. As shown in Fig. 4, the jaws of the nippers are provided with a circular aperture at their lower extremity for the reception of a threaded screw. One jaw 1 of these nippers has an extension 1' at its lower end intended to be impinged against by the pin $a^3$ of the channel $a$, so as to cause the nippers to open and release the screw.

The slide 4, with the nippers hereinabove described, may be moved backward and forward upon the plate 8, which, with its angle-piece or square 9, is secured to a stationary part of the screw-cutting lathe—say to the guide-rest B—provided for guiding the wire bar or rod, as shown Fig. 6, the object being to enable the said nippers to be brought nearer to or to carry them away from the work, as the case may be, and the said slide has a slot 10 in the center, which, in conjuction with the two arresting-screws 11 and 12, which are screwed into the plate 8, serves to limit the extent of motion of such slide 4. To this end an arm 13, doubly bent or cranked at right angles, is attached to the slide 4, which at one end carries a pin 14 for a helical spring 15 to engage with, while through its other extremity is passed a screw 16, terminating in a hook 17 and having its position secured by means of a counter-nut 18. The spring 15 at its opposite end engages with the hook 19, secured in the upper part of the plate 8. With the hook 17 of the screw-bolt 16 there engages a chain 20, Fig. 7, the opposite terminal of which is attached to the bell-crank lever 21, such lever being controlled by the pin of the cam 24, mounted on the driving-shaft 23, in such a manner that as the pin 22 slides over the bell-crank lever 21, the chain 20, the arm 13, and along with such arm the slide 4, are drawn downward, whereby the nippers are made to impinge upon the threaded portion of the screw. The speed of the cam 24 and the length of the bell-crank lever 21 are so proportioned that the nippers are retained in the position to which they have been pulled down, Fig. 9, until the threading of the screw $x$ is completed and the chute or channel $a$ of the intercepter is brought up under such screw $x$ and has, in fact, been moved for such a distance as will enable the pin $a^3$ of the receiving-chute $a$ to strike the nose I' of the jaw 1 of the nippers, Fig. 9, thereby compelling such jaw to perform a rotary movement about the pivot 3, at which juncture the screw $x$ will drop out of the nippers and be caught in the chute $a$. The moment the pin 22 releases the lever 21 the slide 4, under the action of the spring 15, returns to its initial position, which is limited by the screw 12, working in the slot 10.

Having now particularly described and ascertained the nature of my said invention and in what manner the same is to be performed, I declare that what I claim is—

1. In combination for a screw-machine, a movable chute for delivering the screws, suitably-timed means for moving the said chute into and out of position to receive the screws, and a holding device for the screws which is released by the movement of the said chute, substantially as set forth.

2. In combination for a screw-machine, a movable chute for delivering the screws, means for actuating the said chute, and means controlled by the said chute for releasing and dropping the screws into said chute, substantially as set forth.

3. In combination for a screw-machine, a movable chute for delivering the screws, means for actuating the said chute, and a spring-pressed jaw or clamp for holding the screws, which is engaged and opened by the said chute, substantially as set forth.

4. In combination for a screw-machine, a movable chute for delivering the screws, suitably-timed means for bringing the said chute into position to receive the screws after the cutting or other operation has ceased, and a holder for holding the screws independently of the rotary parts of the machine, and means for releasing the screws from the holder, substantially as set forth.

5. In combination for a screw-machine, a movable chute for delivering the screws, a holding device for the screws, movable transversely to the said screws, and suitably-timed means for moving the said holding device to and fro transversely to the screws, to receive and hold the successive screws, substantially as set forth.

6. In combination in a screw-lathe and with the tools for operating on the screws or screw-blanks, a movable holding device for the screws, supports for the said holding device upon which it is free to slide to and fro, means for so sliding the said device to and fro transversely to the axial line of said screws or blanks, and means for opening and closing the holding device, substantially as set forth.

7. In combination in a screw-lathe and with the tools for operating on the screws or screw-blanks, a holding device for the screws having one or more spring-pressed jaws with inclined surfaces shaped to be opened by, and slipped transversely over, the rounded surfaces of the screws or screw-blanks, supports upon which the said holding device slides and is guided, and mechanism for advancing the said holding device transversely to the said screws or screw-blanks to engage and hold successive screws and for retracting the said holding device, substantially as set forth.

8. In combination in a screw-lathe and with the tools for operating on the screws or screw-blanks, a delivering-chute pivotally mounted, and means for rocking or oscillating the said chute both horizontally and vertically, to receive and deliver successive screws, substantially as set forth.

9. In combination in a screw-lathe and with the tools for operating on the screws or screw-blanks, a delivering-chute pivotally mounted, and means for rocking or oscillating the said chute both horizontally and vertically, to receive and deliver successive screws, and means for supporting the successive screws independently of the rotary parts of the said machine, substantially as set forth.

In testimony whereof I affix my signature in presence of two witnesses.

OTTO SROKA.

Witnesses:
ERWIN L. GOLDSCHMIDT,
HENRY HASPER.